(12) United States Patent
Chan

(10) Patent No.: US 9,400,631 B2
(45) Date of Patent: Jul. 26, 2016

(54) MULTIFUNCTIONAL MEDIA PLAYERS

(71) Applicant: Sik Kee Chan, Hong Kong (HK)

(72) Inventor: Sik Kee Chan, Hong Kong (HK)

( * ) Notice: Subject to any disclaimer, the term of this patent is extended or adjusted under 35 U.S.C. 154(b) by 0 days.

(21) Appl. No.: 14/335,878

(22) Filed: Jul. 19, 2014

(65) Prior Publication Data
US 2016/0019020 A1      Jan. 21, 2016

(51) Int. Cl.
*G06F 17/00*      (2006.01)
*G06F 3/16*       (2006.01)
*H04N 21/242*     (2011.01)
*H04N 21/43*      (2011.01)

(52) U.S. Cl.
CPC .............. *G06F 3/165* (2013.01); *H04N 21/242* (2013.01); *H04N 21/4307* (2013.01)

(58) Field of Classification Search
CPC . H04H 60/04; H04H 60/05; H04N 21/23406; H04N 21/242; H04N 21/4307; H04N 21/6125; G06F 3/165
See application file for complete search history.

(56) References Cited

U.S. PATENT DOCUMENTS

2002/0103919 A1*  8/2002  Hannaway ....... H04N 21/23406
                                                  709/231
2006/0224262 A1*  10/2006 Asada ................... H04H 60/04
                                                  700/94

* cited by examiner

*Primary Examiner* — Andrew C Flanders
(74) *Attorney, Agent, or Firm* — Matthew M. DiMaggio Esq.

(57) ABSTRACT

According to embodiments of the invention, systems, methods and devices are directed to multifunctional media players that allow multiple musicians to play musical instruments at the same time in different locations. Various embodiments of the invention implement several novel features, including, in one embodiment, an orchestra system that includes a system configured to provide a plurality of multifunctional media players playing various songs. Each multifunctional media player includes a picture capturing device and a sound recorder as communication means to control synchronization among other said multifunctional media players.

6 Claims, 2 Drawing Sheets

MULTIFUNCTIONAL MEDIA PLAYERS

FIELD OF THE INVENTION

This invention generally relates to multimedia. Specifically, this invention relates to synchronizing music played by various musical instruments played by various users at different locations contemporaneously.

BACKGROUND OF THE INVENTION

A rehearsal of an orchestra is an event that occurs as preparation for a performance. It is undertaken as a form of practicing, to ensure that all details of the subsequent performance are adequately prepared and coordinated. Rehearsals are generally held in theatres or opera houses, in preparation for performance before an audience. Rehearsals that occur early in the production process are sometimes referred to as run-throughs.

Typically a run-through does not contain many of the technical aspects of a performance, and is primarily used to assist performers in learning dialogue and to solidify aspects of blocking and stage movement. Commonly, in an orchestra practice, thirty to forty musicians would generally participate. These people must be physically present at the same time. However, for those who have prior commitment with studies and work, committing to practice at a single location may be difficult. It is, therefore, desirable to have orchestra rehearsals to be held in different places so that members can participate with the rehearsals with greater flexibility.

Therefore, it is an objective of the disclosed technology to provide multifunctional media Players for facilitating real-time collaboration and synchronization of musical instrument output.

SUMMARY OF THE INVENTION

According to embodiments of the invention, systems, methods and devices are directed to multifunctional media players that allow multiple musicians to play musical instruments at the same time in different locations. Various embodiments of the invention implement several novel features, including, in one embodiment, an orchestra system that includes a system configured to provide a plurality of multifunctional media players playing various songs. Each multifunctional media player includes a picture capturing device and a sound recorder as communication means to control synchronization among other said multifunctional media players.

In an embodiment of the disclosed invention, an orchestra system is used for facilitating synchronization of multiple musicians playing musical instruments at the same time. The musicians may be located spatially and geographically at different points around the world. The orchestra system may have one or more of the following components: a) a system configured to provide a plurality of multifunctional media players playing various songs; b) a first multifunctional media player associated with a first user; c) a second multifunctional media player associated with a second user; d) a third multifunctional media player associated with an orchestra leader; and/or e) a voice handler for receiving instructions from the orchestra leader to play a song.

Each of the multifunctional media players may include a picture capturing device and a sound recorder. The instructions from the orchestra leader may be captured using the picture capturing device and/or the sound recorder. Furthermore, each multifunctional media player may install a speed detector that can detect whether speed of incoming music currently being played is synchronized with: i) the movement of the orchestra leader; and ii) the music played by a musical instrument corresponding to each of the multifunctional media players.

In a further embodiment of the orchestra system, the voice handler may carry out the following steps, not necessarily in the following order: i) display movement of the orchestra leader to each of the multifunctional media players; ii) receive music from each of the multifunctional media players using the sound recorder; and iii) determine, using the speed detector, whether the music playing from the multifunctional media players is synchronized with the movement of the orchestra leader.

Still further, the voice handler may i) mix the music into the system and deliver the mixed music to each of the multifunctional media players when the music playing from the multifunctional media players is synchronized, and ii) execute following steps when the music playing from the multifunctional media players fails to synchronize with the orchestra leader: a) adjust a pace of the orchestra leader to the multifunctional media players that are not synchronized, by either slowing down the movement of the orchestra leader or increasing the pace of the movement of the orchestra leader, wherein a pace of the displayed orchestra leader is unchanged to the multifunctional media players that are synchronized; b) mix the music into the centralized system only after adjustment, before delivering the mixed music to each of the multifunctional media players; and/or c) alert specific users that are not synchronized by sending visual notifications only to the respective multifunctional media players associated with the users that are not synchronized provide tips of improvement to the users.

In yet a further embodiment of the disclosed technology, if it is determined that the music being played from the multifunctional media players is not synchronized to the orchestra leader, the voice handler further determines, using a key detector, whether the music playing from the multifunctional media players is on or off key.

Still further, if the music being played from the multifunctional media players fails to sync with the orchestra leader, the voice handler further determines which specific musical instrument is off key, and sends tips to the respective multifunctional media player associated with the user; and adjusts a pitch or a volume of sound received from the respective multifunctional media player before mixing the off key music with the rest of the music played by other musical instruments.

In embodiments of the disclosed technology, the musical instruments may be any type of instrument, whether analog or electronic, including, but not limited to, string instruments, brass instruments, wind instruments, and percussion instruments. Furthermore, the multifunctional media players may include, but are not limited to home media players, mobile phones, tablet computers, laptop computers, desktop computers, e-readers, personal digital assistants ("PDA") and/or any other electronic device capable of communicating with other devices over any type of network.

In accordance with these and other objects which will become apparent hereinafter, the invention will now be described with particular reference to the drawings.

DETAILED DESCRIPTION

According to embodiments of the invention, systems, methods and devices are directed to multifunctional media players for facilitating real-time collaboration and synchronization of musical instrument output. The multifunctional media players that allow multiple musicians to play musical instruments at the same time in different locations. Various embodiments of the invention implement several novel features, including, in one embodiment, an orchestra system that includes a system configured to provide a plurality of multifunctional media players playing various songs. Each multifunctional media player includes a picture capturing device and a sound recorder as communication means to control synchronization among other said multifunctional media players.

Referring now to the figures, an orchestra system/device is used for facilitating real-time collaboration and synchronization of musical instrument output. A "system" and/or a "device" may be any device having one or more inputs and outputs, and is used to exemplary purposes. Thus, the terms "system" and "device" are not meant to be limiting in any manner.

Figure 1:
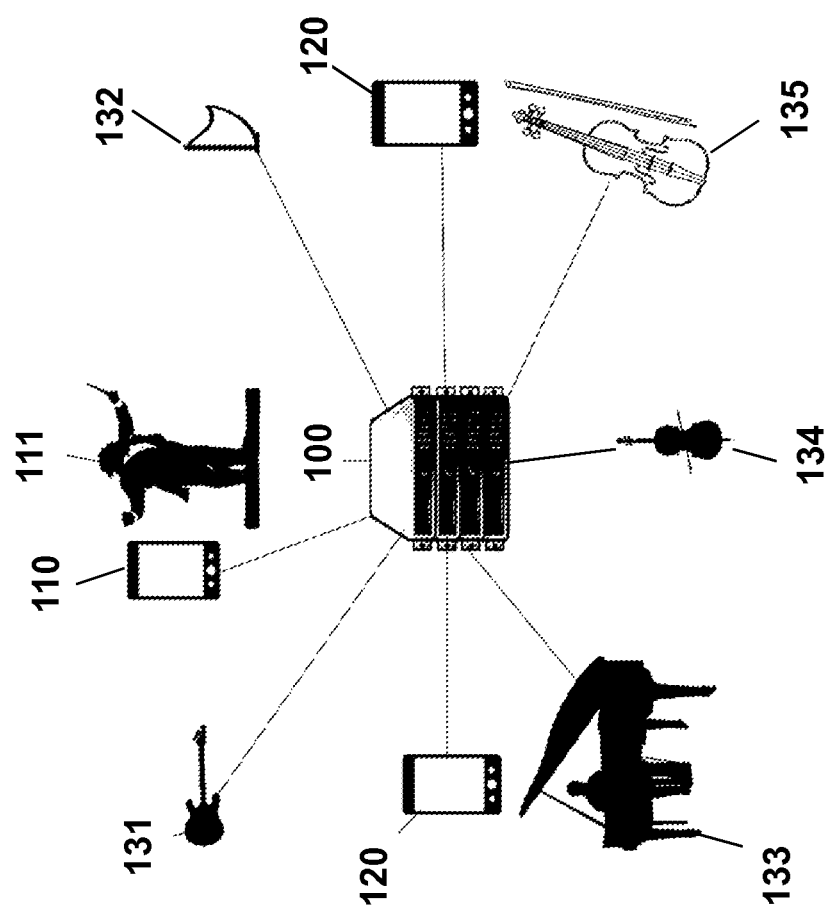
FIG. 1 is a generalized overview of a possible orchestra system configuration according to an embodiment of the disclosed technology.

FIG. 1 is a generalized overview of a possible orchestra system configuration according to an embodiment of the disclosed technology. The system 100, may be a central communication node for receiving, interpreting, encrypting, displaying, and/or send data. The data may include media such as audio, text, video, and imagery. The system 100 may be any device, such as a computing device, that is capable of carrying out functions using a processor, memory and/or any other necessary components. The system 100 may be a remotely located server that is accessible via a network.

The system 100 may be managed by an orchestra leader 111 or by any other user. The orchestra leader 111 may fill the role of the typical conductor or leader of a band or orchestra. The orchestra leader 111 may have an associated multifunctional media player 110 for sending and receiving data, signals, directions, and video/audio feeds. The multifunctional media player 110 of the leader 111 may be used to send this data to other multifunctional media players 120 associated with other members of the band, group or orchestra.

The multifunctional media players 110 and 120 may be mobile devices, tablet computers, desktop computers, laptop computers, or any other device that is capable of capturing, sending and receiving data and media over a network. The communication between the leader's multifunctional media player 110 and the other multifunctional media players is carried out via the system 100. The communication may occur over a local area network (LAN), wide area network (WAN), packet-switch data network, or any other network suitable for sending and receiving data.

One or more users or orchestra members may be located within a range of one of the multifunctional media players 120. The range may be defined as being sufficiently close to the multifunctional media player 120 such that the media player may capture sound, video and/or imagery outputted by the user or an instrument played by the user.

Referring still to FIG. 1, examples of instruments are depicted, each of which is within range of a multifunctional media player 120. For example, a user playing a guitar 131 and/or a piano 133 may be at one geographic location, wherein the geographic location has at least one multifunctional media player 120. Further, other members of the group or orchestra may be playing a harp 132, a cello 134 and/or a violin 135 at another the location of another multifunctional media player 120. The musical instruments may be any type of instrument, whether analog or electronic, including, but not limited to, string instruments, brass instruments, wind instruments, percussion instruments, mixers, computerized music production/performance systems, and or any other device or apparatus capable of producing audible sound. Thus, "musical instrument" may be defined as any device, person, animal or combination thereof that is capable of emitting sound. Thus, human voice (i.e. singing) may also be considered a "musical instrument" for purposes of this speciation.

Thus, members of a band, orchestra or group may collaborate and synchronize music from locations all around the world in real-time. The system 100 may be capable of ensuring a smooth synchronization and collaboration in order to compensate for any connection disruptions, network slowdowns, and/or bandwidth fluctuations. Thus, the musicians may be located spatially and geographically at different points around the world.

Furthermore, each multifunctional media player 110 and 120 may install a speed detector that can detect whether speed of incoming music currently being played is synchronized with the movement of the orchestra leader, and/or the music played by a musical instrument corresponding to each of the multifunctional media players.

If the music being played from the multifunctional media players 110 and/or 120 fails to synchronize with the orchestra leader 111, a voice handler associated with either the multifunctional media players or the system 100 determines which specific musical instrument is off key, and sends tips, data or corrective information to the respective multifunctional media player associated with the user; and adjusts a pitch or a volume of sound received from the respective multifunctional media player before mixing the off key music with the rest of the music played by other musical instruments. if it is determined that the music incoming from the multifunctional media players 120 is not synchronized to the orchestra leader 111, the voice handler further determines, using a key detector, whether the music playing from the multifunctional media players is on or off key.

Figure 2:
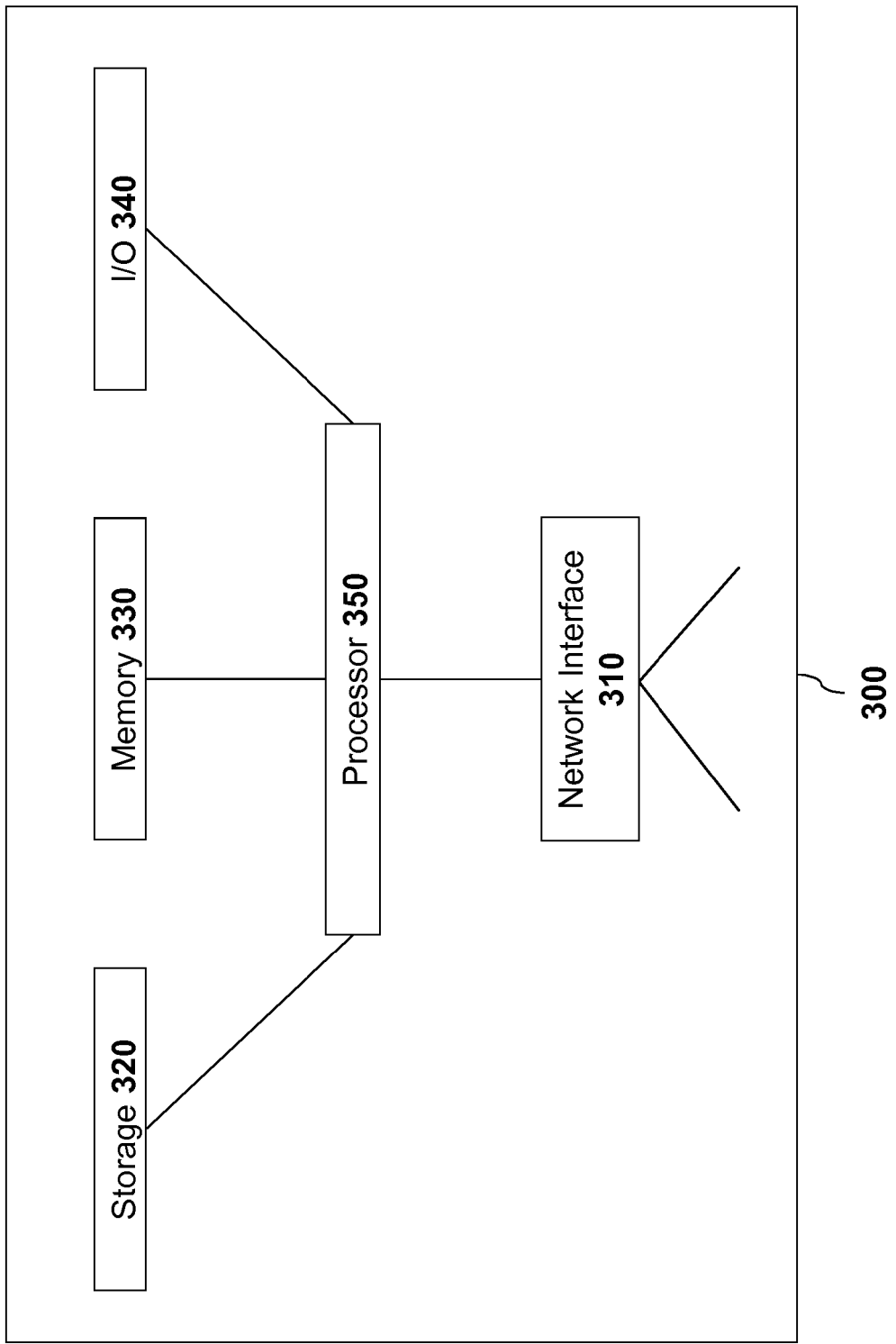
FIG. 2 is a high-level block diagram of a microprocessor device that may be used to carry out the disclosed technology.

FIG. 2 is a high-level block diagram of a microprocessor device that may be used to carry out the disclosed technology. The device 300 may or may not be a computing device. The device 300 comprises a processor 350 that controls the overall operation of a computer by executing the reader's program instructions which define such operation. The device's program instructions may be stored in a storage device 320 (e.g., magnetic disk, database) and loaded into memory 330 when execution of the console's program instructions is desired. Thus, the device's operation will be defined by its program instructions stored in memory 330 and/or storage 320, and the console will be controlled by the processor 350 executing the console's program instructions.

The device 300 may also include one or a plurality of input network interfaces for communicating with other devices via a network (e.g., the internet). The device 300 further includes an electrical input interface for receiving power and data from a power or wireless data source. The device 300 may also include one or more output network interfaces 310 for communicating with other devices. The device 300 may also include input/output 340 representing devices which allow for user interaction with a computer (e.g., display, keyboard, mouse, speakers, buttons, etc.).

One skilled in the art will recognize that an implementation of an actual device will contain other components as well, and that FIG. 2 is a high level representation of some of the components of such a device for illustrative purposes. It should also be understood by one skilled in the art that the devices depicted and described with respect to FIG. 1 may be implemented on a device such as is shown in FIG. 2. Thus, the device 300 of FIG. 2 may describe the inner workings of either the multifunctional media players 120, 110 and/or the system 100.

While the disclosed invention has been taught with specific reference to the above embodiments, a person having ordinary skill in the art will recognize that changes can be made in form and detail without departing from the spirit and the scope of the invention. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

The invention claimed is:

1. An orchestra system for facilitating synchronization of multiple musicians playing musical instruments at the same time, comprising:
a system configured to provide a plurality of multifunctional media players playing various songs, wherein:
each multifunctional media player includes a picture capturing device and a sound recorder; and
each multifunctional media player installs a speed detector that can detect whether speed of incoming music currently being played is synchronized with i) the movement of the orchestra leader, and ii) the music played by a musical instrument corresponding to each of the multifunctional media players;
a first multifunctional media player associated with a first user;
a second multifunctional media player associated with a second user;
a third multifunctional media player associated with an orchestra leader; and
a voice handler for receiving instructions from the orchestra leader to play a song, wherein the instructions from the orchestra leader are captured using the picture capturing device; wherein the voice handler:
i) displays movement of the orchestra leader to each of the multifunctional media players;
ii) receives music from each of the multifunctional media players using the sound recorder; and
iii) determines, using the speed detector, whether the music playing from the multifunctional media players is synchronized with the movement of the orchestra leader.

2. The orchestra system of claim 1, wherein:
the voice handler:
i) mixes the music into the system and delivers the mixed music to each of the multifunctional media players when the music playing from the multifunctional media players is synchronized; and
ii) executes following steps when the music playing from the multifunctional media players fails to synchronize with the orchestra leader:
a) adjusting a pace of the orchestra leader to the multifunctional media players that not synchronized, by either slowing down the movement of the orchestra leader or increasing the pace of the movement of the orchestra leader, wherein a pace of the displayed orchestra leader is unchanged to the multifunctional media players that are synchronized;
b) mixing the music into the centralized system only after adjustment, before delivering the mixed music to each of the multifunctional media players; and
c) alerting specific users that are not synchronized by sending visual notifications only to the respective multifunctional media players associated with the users that are not synchronized provide tips of improvement to the users.

3. The orchestra system of claim 2, wherein if the music being played from the multifunctional media players is not synchronized to the orchestra leader, the voice handler further determines, using a key detector, whether the music playing from the multifunctional media players is on or off key.

4. The orchestra system of claim 2, wherein if the music being played from the multifunctional media players fails to sync with the orchestra leader, the voice handler further determines which specific musical instrument is off key, and sends tips to the respective multifunctional media player associated with the user; and adjusts a pitch or a volume of sound received from the respective multifuctional media player before mixing the off key music with the rest of the music played by other musical instruments.

5. The orchestra system of claim 3, wherein the musical instruments are string instruments, brass instruments, wind instruments, and percussion instruments.

6. The orchestra system of claim 4, wherein the multifunctional media players include home media players.

* * * * *